United States Patent [19]
McRae

[11] Patent Number: 5,118,424
[45] Date of Patent: Jun. 2, 1992

[54] THIN FILM COMPOSITE MEMBRANES FROM VINYL AND RELATED NOMOMERS

[75] Inventor: Wayne A. McRae, Zurich, Switzerland

[73] Assignee: Ionics Incorporated, Watertown, Mass.

[21] Appl. No.: 620,989

[22] Filed: Nov. 30, 1990

[51] Int. Cl.$^5$ .................. B01D 61/00; B01D 39/00
[52] U.S. Cl. .................. 210/653; 210/654; 210/490; 210/500.27; 210/50.28; 210/500.37; 210/500.38; 210/500.42; 210/500.43; 264/45.1
[58] Field of Search .................. 210/500.38, 500.37, 210/500.41, 500.42, 500.28, 500.34, 500.35, 490, 651, 654, 500.23, 500.27, 653; 55/16; 264/45.1; 204/157.15

[56] References Cited

U.S. PATENT DOCUMENTS

| | | | |
|---|---|---|---|
| 3,276,996 | 7/1963 | Lazare | 210/654 |
| 4,259,183 | 3/1981 | Cadotte | 210/654 |
| 4,277,344 | 7/1981 | Cadotte | 210/654 |
| 4,302,336 | 11/1981 | Kawaguchi et al. | 210/654 |
| 4,753,725 | 6/1988 | Linder et al. | 210/500.42 |
| 4,784,736 | 11/1988 | Lonsdale et al. | 204/157.15 |
| 4,787,977 | 11/1988 | Nakano et al. | 210/500.37 |
| 4,792,404 | 12/1988 | Swedo et al. | 210/654 |
| 4,814,082 | 3/1989 | Wrasidlo | 210/500.37 |
| 4,913,816 | 4/1990 | Waite | 210/490 |
| 4,917,800 | 4/1990 | Lonsdale et al. | 210/490 |
| 5,015,380 | 5/1991 | Sundet | 210/500.38 |

Primary Examiner—Robert A. Dawson
Assistant Examiner—Ana M. Fortuna
Attorney, Agent, or Firm—Norman E. Saliba

[57] ABSTRACT

Novel thin film composite membranes are disclosed. They are prepared from vinyl and related monomers by phase transfer catalysis at the interface between one phase containing a polymerizable vinyl or related monomer and a second phase containing an entity necessary to initiate polymerization of the monomer. The two phases are substantially insoluble in each other. At least one of the phases is a fluid. One of the phases is integral with a porous support or substrate or a precursor of such support or substrate such as a porous organic or inorganic diaphragm made by thermal phase inversion from which the soluble phase has not been extracted.

14 Claims, No Drawings

THIN FILM COMPOSITE MEMBRANES FROM VINYL AND RELATED NOMOMERS

Background of the Invention

1. Field of the Invention

The invention resides in the field of thin film composite membranes suitable for example for reverse osmosis, nanofiltration, ultrafiltration, dialysis (including hemodialysis), pervaporation, gas separation and the like, such membranes being prepared from vinyl and related monomers by interfacial (interphasal) polymerization.

2. Description of the Prior Art

It is well known that thin film composite membranes ("TFC membranes" hereinafter) have been made by interfacial (i.e. interphasal) polymerization, for example of: (a) dissolved in an aqueous phase: di-, tri- and/or polyamines (e.g. metaphenylenediamine, piperazine, polyethylenimine) or amine adducts (e.g. adducts of amines with ethylene oxide), with: (b) dissolved in a solvent substantially insoluble in the above mentioned aqueous phase (e.g. a volatile aliphatic or fluorochloroaliphatic solvent): di- and/or tri- acyl halides (e.g. terephthaloyl chloride, isophthaloyl chloride, trimesoyl chloride, cyclohexane-1,3,5-tricarbonyl chloride) or a di-isocyanate (e.g. toluene di-isocyanate) or the like.

Each of the above mentioned phases may contain additional and/or auxiliary substances. E.g. the aqueous phase may contain acid acceptors (for instance triethyl amine) if an acyl halide is used, surfactants (e.g. lauryl sulfate or poly-S-(vinyl benzyl)-S,S-dimethyl sulfonium chloride) and water insoluble but emulsified substances (e.g. a butadiene-styrene copolymer latex) or other substances (e.g. sodium sulfate or polyvinyl alcohol).

Generally at least the near interior of at least one surface ("substantial surface" hereinafter) of a microporous substrate (e.g. of polysulfone ("PSU"), poly ether sulfone ("PES") poly ether ether sulfone ("PEES"), poly ether ketone ("PEK"), poly ether ether ketone ("PEEK"), polyvinylidene fluoride ("PVDF") and the like) preferably having a narrow distribution of pore sizes is carefully saturated with the above mentioned aqueous phase (to avoid the presence of any unfilled surface pores on penalty otherwise of inutility of the final TFC membrane in most applications thereof). The uniformly saturated substantial surface (substantially free of pores unfilled at the substantial surface) is exposed briefly to the organic phase.

As noted above the solvent for the organic phase is generally volatile (though such does not seem to be a fundamental requirement). The concentrations of polymerizable materials in each phase are generally in the vicinity of about 1 percent by weight. There seem to be few examples in which the organic phase is sorbed in the microporous substrate and the thus saturated substrate exposed to an aqueous solution of amine though in principle there seems to be no fundamental reason why such inversion should not be technically feasible.

After brief exposure of the two immiscible phases to each other the substrate is allowed to dry at room or elevated temperature to promote the copolymerization and/or crosslinking of the amines with the acyl halides or isocyanates.

TFC membranes made as above are useful for example in reverse osmosis ("RO" also called hyperfiltration "HF"), nanofiltration ("NF"), ultrafiltration ("UF"), diffusion dialysis ("DD"), including hemodialysis ("HD"), gas-separation ("GS") and pervaporation ("PV", also called membrane permeation "MP").

The product of the above mentioned interfacial contact is a thin film of polyamide or polyurea. (Poly urethanes, i.e. polycarbamates, seem not to be used). In addition the film often contains free, ionizable groups e.g. amine, carboxylate or sulfonate groups. It seems likely that the specific water permeability of such film is closely related to its specific water content whereas the "specific" salt rejection is closely related to the ratio of amide and/or urea groups to such water content. The bound, ionizable amine, carboxylate and/or sulfonate groups seem to increase the water content above what would result solely from the amide or urea groups. Ionized groups such as sulfonate no doubt contribute to salt rejection (at least at low salt concentrations) by the Donnan Exclusion principle, rejecting ions of like charge ("co-ions").

Such thin films can be sensitive to chlorination and/or oxidation. The points of attack seem to be any hydrogen ("H") atom on a nitrogen ("N") or aliphatic carbon ("C") atom adjacent to a carbonyl group, an aromatic ring or other electron withdrawing group. Hence it has been advantageous to use as amine a secondary amine (e.g. the di-secondary amine piperazine) and as the acyl halide an aromatic acyl halide such as trimesoyl chloride. Polyureas in which the nitrogens are free of directly bound H cannot be made in one step from isocyanates.

SUMMARY OF THE INVENTION

It has now been discovered that TFC membranes may advantageously be made from vinyl and related monomers by preparing two substantially immiscible phases (at least one of which is fluid and may be a gas or vapor phase), one containing polymerizable vinyl and/or related functional monomers optionally vinyl and/or related crosslinking agents and other additives and the second phase containing part or all of the polymerization initiation system and optionally vinyl and/or related monomers not substantially homopolymerizable by said part or all of the initiation system but copolymerizable with the vinyl and/or related monomers in the above first mentioned phase. In the event that the initiation system consists of two or more interreacting components then one such component may be in one of the above mentioned phases and another such component in the other phase. A suitable microporous substrate well-known in the art (e.g. a polysulfone, polyethersulfone, polyvinylidene fluoride, alumina, silica or graphite microporous substrate ) is saturated thoroughly in at least one substantial surface with one phase and the thus saturated substrate then exposed for an appropriate period at an appropriate temperature to the other phase. Depending on the choice of vinyl and/or related monomers and of polymerization system the polymerizable monomers may be in the phase in the microporous substrate or in the phase external to the substrate. For example if the vinyl and/or related functional monomers and optional vinyl and/or related crosslinking agents are soluble in an organic liquid which is not substantially miscible with water then the polymerization initiator may be for example a water solution of peroxydisulfate and ferrous salts. As a further example, an aqueous solution of an aryldiazonium, diaryliodonium, triarylsulfonium or triarylselenium salt may be sprayed on a substrate surface which has been saturated with the organic solution of vinyl and/or related functional monomers and crosslinking agents. Polymerization may then be initiated by irradiation with light.

On the other hand if the functional monomers and crosslinking agents are soluble in polar and/or hydrogen-bonding solvents (e.g. alcohols, water, formamide, dimethyl formamide, dimethyl acetamide, N-methyl-2-pyrrolidone, 2-pyrrolidone, gamma-butyrolactone, dimethyl sulfoxide, sulfolane) then the polymerization initiator may be dissolved in a solvent non-miscible therewith, selection of which depends on the choice of polar and/or hydrogen bonding solvent but may be for example hexane, sym-dibromotetrafluoroethane, 1,1,2-trichloro-1,2,2-trifluoroethane (e.g. Freon 113). The polymerization initiator dissolved in such solvent may be a free radical initiator such as an organic peroxide (with or without a promoter), an azo compound or may be an ionic initiator, the choice depending not only on the solvent chosen for the functional monomers and crosslinking agents but also on such functional monomers and crosslinking agents per se. Photo initiators may be used such as benzoin ethers, 4-tertiary butyltrichloroacetophenone, 1-phenyl-1,2-propanedione-2-O-benzoyloxime or alpha, alpha-diethoxy acetophenone. Ziegler-Natta and solid catalysts may also be used.

I have found that TFC membranes prepared as above and suitable for RO, NF, UF and the like preferably have an amide capacity of at least about 2, more preferably at least about .4 milligram equivalents/dry gram of film (not counting the substrate) and a carboxylic, phosphonic or sulfonic capacity of about 2 milligram equivalents/dry gram on the same basis. I have also found that such films when swollen in water should have quite low water contents, e.g. order of magnitude 10 percent by weight on a wet basis (excluding the substrate) preferably having an amide capacity when in equilibrium with water of not less than about 10 milligram equivalents of amide moieties per gram of imbibed water. Such low water contents are obtained by using suitable amounts of crosslinking agents and/or inert monomers i.e. monomers which do not substantially bind water. Further I have found that a preferred vinyl or related functional monomer for many purposes in accordance with this invention is N,N-dimethyl methacrylamide, a homopolymer of which has an amide capacity of about 8.8 milligram equivalents per dry gram. Said monomer can therefore be readily formulated with for example methacrylic acid, a crosslinking agent and/or an inert (i.e. diluent) polymerizable monomer such as methyl methacrylate. I have found that hydrated homopolymers of N,N-dimethyl methacrylamide or hydrated copolymers thereof with methacrylic acid and/or methyl methacrylate are not substantially attacked at room temperature by water having a pH between about 7 and 8 and containing about 1 ppm available chlorine. Other preferred vinyl and related monomers for some of the purposes of this invention include without limitation:

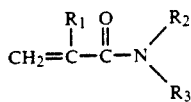

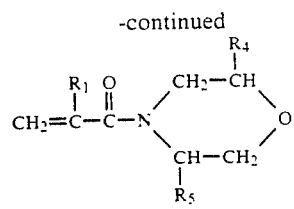

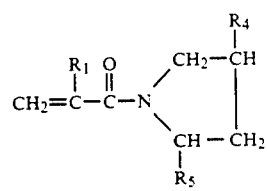

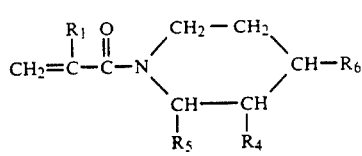

where $R_1$, $R_2$ and $R_3$ may be independently alkyl, alkoxy or alkoxyalkyl groups and the like, less preferably hydrogen; $R_4$, $R_5$ and $R_6$ may independently be hydrogen or alkyl, alkoxy, alkoxyalkyl groups and the like.

Another group of preferred monomers is represented by:

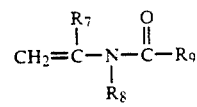

where $R_7$, $R_8$ and $R_9$ are independently selected from the group consisting of alkyl, alkoxy and alkoxyalkyl groups and any two of $R_7$, $R_8$ and $R_9$ may be part of the same cyclic alkyl, alkoxy or alkoxyalkyl group. $R_7$ and $R_9$ may also be hydrogen. Less preferably $R_8$ may be hydrogen. If $R_9$ is hydrogen the resulting functional monomers are N-vinyl formamides. If $R_9$ has a hydrogen on the alpha carbon then such hydrogen will be labile and subject to oxidation or chlorination. $R_9$ is therefore preferably $Cl_3C$-, $F_3C$-, phenyl- or $(CH_3)_3C$- in which case the functional monomer may be prepared from the corresponding amides or imides for example by:

vinylation with acetylene using for example mercuric sulfate or acetyl sulfuric acid as catalyst;
dehydration of hydroxyethyl substituents (from acetaldehyde, ethylene oxide or ethylene chlorohydrin); or
vinyl exchange.

Examples of such preferred functional monomers are:
N-vinyl pyrrolidone
N-vinyl caprolactam
N-vinyl acetamide.

Functional monomers which do not have active hydrogen on the carbon atom alpha to the carbonyl are preferred. Examples of other preferred monomers include:
N-vinyl succinimide
N-vinyl phthalimide
N-vinyl ethyleneurea
N-vinyl propyleneurea
allyl urea
crotonamide N-vinyl phthalimide does not have active hydrogen on the phthalimide moiety.

Also useful in this invention are N-benzyl acrylamide and methacrylamides, tertiary butyl-N-vinyl carbamate, N-vinyl urea, N-vinyl-N-methyl acetamide, the N-phenyl acrylamides and methacrylamides, vinyl chloroformate and vinyl acetic acid chloride. The latter two monomers are preferably reacted with an amine before or after polymerization, more preferably a secondary amine such as dialkyl amine, morpholine or piperidine or a di-secondary amine such as N,N,N'N'-tetraalkyl ethylene diamine or piperazine.

The above examples are intended to be suggestive and not exhaustive. Equivalents will be readily apparent to those skilled in the art. In addition S-vinyl and N-vinyl sulfonamides and P-vinyl and N-vinyl phosphonamides are useful. Also useful are TFC membranes prepared in accordance with this invention and comprising polymers (preferably crosslinked) containing vinyl acetate and/or such polymers which have been partially or substantially completely hydrolyzed to yield vinyl alcohol moieties.

Suitable crosslinking agents are preferably at least partially soluble in the same solvent as the functional monomer. Divinyl sulfone, methylene bis methacrylamide (and its analogues) are particularly useful owing to their solubilities in polar and/or hydrogen-bonding solvents though each has active hydrogen in the polymerized state. Also useful are N,N-diallyl acrylamide, N,N'-divinyl pyro mellitic acid diimide, N-allyl acrylamide, N,N'-diallyl tartardiamide, trivinyl cyclohexane, N,N-(1,2-dihydroxyethane) bisacrylamide, N,N,'N'' triallyl citric triamide, divinyl benzene, ethylene glycol dimethacrylate and its analogues. In a preferred procedure a mixture of methyl methacrylate, (and/or methacrylic acid), piperazine, piperidine (and/or morpholine ) and a polymerization inhibitor is heated optionally in a mutual solvent to produce a mixture of N,N bismethacrylopiperazinimide and N-methacrylopiperidinimide (and/or N-methacrylomorpholinimide) which need not be separated. An excess of the amines may be used and can be rinsed out of the TFC membrane after polymerization. Some unconverted methyl methacrylate or methacrylic acid is not harmful for many uses of the resulting TFC membranes. Preferably any such mutual solvent is lower boiling than the imides so the TFC membranes can be prepared substantially free of solvent. Preferably also any such mutual solvent is not a solvent or good swelling agent for the TFC membranes.

An alternate preferred procedure comprises preparing a mixture of methacrylic acid, piperazine and piperidine (and/or morpholine), that is the methacrylate salts of the amines, preferably with an excess of the acid, polymerizing the TFC membrane from such mixture as described above and the heating the TFC membrane at a temperature less than the softening point of the substrate to dehydrate the salts to the imides.

In a preferred process according to this invention the polymerizable vinyl and/or related functional monomers, the vinyl and/or related crosslinking agents and optional additives are present in a first fluid phase at concentrations which are preferably in the range of from about 0.1 to about 10 percent by weight, most preferably from about 0.5 to about 2 percent by weight. A second fluid phase is prepared, substantially insoluble in the first, containing at least part of the polymerization initiation system, such part being present preferably in the range of from about 0.1 to about 10 percent by weight.

The phrase "vinyl and/or related monomer" and similar phrases are intended to describe and characterize any compound consisting of molecules containing at least one ethylene group $>C=C<$ said molecules characterized by being capable of spontaneous or induced repeated addition by means of the ethylene group to other molecules of the same chemical structure through the ethylene groups of said other molecules and/or to other molecules of differing chemical structure also containing an ethylene group through the last mentioned group, in either case to form high molecular weight compounds being the product of many such repeated additions. "Vinyl and/or related crosslinking agents" and similar phrases are intended to describe vinyl and related monomers consisting of molecules containing more than one such ethylene group (said groups in said molecules not necessarily being identical in structure) and capable of spontaneous or induced repeated additions by means of more than one such ethylene group on such molecules to other molecules of the same or different chemical structure also having ethylene groups through said last mentioned groups. By this definition it is not intended that all ethylene groups on all molecules of the crosslinking agent participate in said repeated addition but that on the average at least fractionally more than one ethylene group per molecule does so participate. Examples of addition inducing means for vinyl and related compounds as defined above include radiation (such as ultraviolet light and gamma rays, such radiation sometimes being effective through ancillary chemical compounds), heat, free radical addition initiators (such as the well known hydroperoxide, peroxide, and azo compounds sometimes also being effective through other ancillary chemical compounds), anionic initiators (such as n-butyl lithium or potassium amide) cationic initiators (such as iodine, boron trifluoride, aluminum trichloride), heterogeneous catalysts (such as molecular sieves, vanadium pentoxide plus triethyl aluminum, $CrO_3$ plus silica gel) homogeneous coordination catalysts (such as the Ziegler and Ziegler-Natta catalysts), and ring opening transition metal catalysts.

EXAMPLE 1

| Solution A is prepared containing | |
|---|---|
| N,N' methylene bisacrylamide: | 15 g/l |
| ferrous ammonium sulfate | 0.3 g/l |
| sodium lauryl sulfate | 0.1 g/l |
| in deionized water. | |
| Solution B is prepared containing: | |
| dibenzoyl peroxide | 2.4 g/l |
| in hexane. | |

Solution A is deaerated by sparging with nitrogen gas. A fabric reinforced microporous polysulfone diaphragm is taped along the edges to a first, clean glass plate, fabric side down. The resulting structure is placed in a first shallow tray containing Solution A in a nitrogen gas purged glove box and a clean roller is worked gently over the surface of the diaphragm to remove air bubbles and saturate the diaphragm with solution A. The structure is removed from the first shallow tray and drained of excess Solution A. Further excess Solution A is removed by running the roller gently once across the surface of the diaphragm. The structure is then immersed briefly in a second shallow tray, containing Solution B. It is then drained, covered with a piece of polyimide film coated on one side with a perfluoro abherent coating (duPont Kapton ®, abherent coating side against the diaphragm) and then covered with a second glass plate. The resulting sandwich is heated in an oven at 80° C. for 90 minutes and then allowed to cool to room temperature. The sandwich is then immersed in a shallow tray of water and the second glass plate and abherent film removed. The microporous diaphragm is removed from the first glass plate by removing the tape. The resulting thin film composite membrane prepared by interfacial polymerization of vinyl and related monomers is found to be useful in nano-filtration and ultrafiltration. In this example all of the vinyl and related monomers are in a first fluid phase in the microporous substrate and a two component polymerization initiation system is used, one component dissolved in the first fluid phase and the second component in a second fluid phase substantially insoluble in the first fluid phase.

EXAMPLE 2

| The procedure of Example 1 is repeated except Solution A contains: | |
|---|---|
| N,N' methylene bisacrylamide | 15 g/l |
| N,N-dimethyl methacrylamide | 11 g/l |
| hydrogen peroxide | 0.35 g/l |
| in deaerated, deionized water. | |
| Solution B contains: | |
| cobalt naphthenate | 0.4 g/l |
| in hexane. | |

The resulting thin film composite membrane prepared by interfacial polymerization of vinyl and related monomers is found to be useful in nanofiltration and ultrafiltration. In this example all of the vinyl and related monomers are in a first fluid phase in the microporous substrate and a two component polymerization initiation system is used, one component dissolved in the first fluid phase and the second component in a second fluid phase substantially insoluble in the first fluid phase.

EXAMPLE 3

The procedure of Example 1 is repeated using Solution A of Example 2. The procedure is modified as follows: After further excess Solution A is removed by running a roller gently once across the surface of the diaphragm, methyl mercaptan is briefly introduced to the exposed surface of the diaphragm. After such exposure the glove box is flushed with nitrogen gas, the diaphragm covered with abherent film and a second glass plate as described in Example 1. The resulting sandwich is further treated as described in Example 1. The resulting thin film composite membrane prepared by interfacial polymerization of vinyl and related monomers is found to be useful in nanofiltration and ultrafiltration. In this example all of the vinyl and related monomers are a first fluid phase in the microporous substrate and a two component polymerization initiation system is used, one component (the peroxide) dissolved in the first fluid phase and the second component (the mercaptan) in a second fluid phase (a gas phase) substantially insoluble in the first fluid phase.

EXAMPLE 4

| The procedure of Example 1 is repeated except Solution A contains: | |
|---|---|
| dibenzoyl peroxide | 2.4 g/l |
| in hexane. | |
| Solution B contains: | |
| N,N' methylene bisacrylamide | 15 g/l |
| ferrous ammonium sulfate | 0.3 g/l |
| sodium lauryl sulfate | 0.1 g/l |
| in deionized water, that is Solution A and B are interchanged. | |

Solution B is deaerated by sparging with nitrogen gas. The resulting thin film composite membrane prepared by interfacial polymerization of vinyl and related monomers is found to be useful in nanofiltration and ultrafiltration. In this example a two component polymerization initiation system is used, one component dissolved in a first fluid phase in the microporous substrate and the second component and all of the vinyl and related monomers in a second phase substantially insoluble in the first fluid phase.

EXAMPLE 5

| The procedure of Example 1 is repeated except Solution A contains: | |
|---|---|
| N,N-dimethyl methacrylamide | 11 g/l |
| ferrous ammonium sulfate | 0.3 g/l |
| sodium lauryl sulfate | 0.1 g/l |
| in deaerated, deionized water. | |
| Solution B contains: | |
| 80% divinyl benzene of commerce | 16 g/l |
| dibenzoyl peroxide | 2.4 g/l |
| in hexane. | |

Solution A is deaerated by sparging with nitrogen gas. The resulting thin film composite membrane prepared by interphasal polymerization of vinyl and related monomers is found to be useful in nanofiltration and ultrafiltration. In this example one vinyl and related monomer (the functional monomer) is dissolved in a first fluid phase which is in the microporous substrate and a second vinyl and related monomer (the crosslinking monomer) is dissolved in a second fluid phase substantially insoluble in the first fluid phase. A two component polymerization initiation system is used, one component dissolved in the first fluid phase and the other component in the second fluid phase.

EXAMPLE 6

| The procedure of Example 1 is repeated except Solution A contains: | |
|---|---|
| 80% divinyl benzene of commerce | 16 g/l |
| dibenzoyl peroxide | 2.4 g/l |
| in hexane. | |
| Solution B contains: | |
| N,N-dimethyl methacrylamide | 11 g/l |
| ferrous ammonium sulfate | 0.3 g/l |
| sodium lauryl sulfate | 0.1 g/l |
| in deaerated, deionized water. | |

Solution B is deaerated by sparging with nitrogen gas. As compared to Example 5 Solutions A and B are effectively interchanged. The resulting thin film composite membrane prepared by interphasal polymerization of vinyl and related monomers is found to be useful in nanofiltration and ultrafiltration. In this example one vinyl and related monomer (the crosslinking monomer) is dissolved in a first fluid phase which is in the microporous substrate and a second vinyl and related monomer (the functional monomer) is dissolved in a second fluid phase substantially insoluble in the first fluid phase. A two component polymerization initiation system is used, one component dissolved in the first fluid phase and the other component in the second fluid phase.

EXAMPLE 7

| The procedure of Example 1 is repeated except Solution A contains: | |
|---|---|
| tetraethylammonium toluene sulfonate | 250 g/l |
| N,N-dimethyl methacrylamide | 11 g/l |
| methacrylic acid | 4.3 g/l |
| 80% divinyl benzene of commerce | 16 g/l |
| ferrous ammonium sulfate | 0.3 g/l |
| in deaerated, deionized water. | |
| Solution B contains: | |
| dibenzoyl peroxide | 2.4 g/l |
| in hexane. | |

Solution A is deaerated by sparging with nitrogen gas. The resulting thin film composite membrane prepared by interphasal polymerization of vinyl and related monomers is found to be useful in nanofiltration and ultrafiltration. This example illustrates the use of a McKee type salt (in this case tetraethylammonium toluene sulfate) in the process of this invention to help solubilize components differing markedly in their solubility characteristics.

EXAMPLE 8

A glass plate prepared in accordance with the procedure of S. Matoba, Ceramics, 23(8), pp 730-734(1988) and having about 77.5% silica, 5 percent alumina and 11% boron oxide and heat treated at a temperature in the range of 500 to 800° C. for sufficient time to develop pores of about 1 micrometer when eventually leached in dilute hydrochloric acid (but not so leached). The plate is immersed in shallow tray of toluene in a glove box flushed with dry nitrogen. The tray is maintained at a temperature in the range of 20° to 30° C. Titanium tetrachloride is added to the toluene followed by triethyl aluminum, forming a dark brown Ziegler type coordination catalyst on the glass surface. Styrene is added to the toluene resulting in immediate polymerization of the styrene directly on the glass. Alternatively a solution of styrene in toluene is added to the tray. The thickness of the polystyrene film is determined preferably by the quantity of styrene added or by removing the glass plate from the toluene after the desired time of exposure. In any case after removing the glass plate from the toluene it is drained of excess toluene and preferably heated briefly at about 250° C. to clarify the film by melting. The glass plate having the polystyrene film on the surface is treated with dilute hydrochloric acid to remove the segregated boron-rich glass yielding a microporous glass plate having a thin film polystyrene membrane as the surface. The resulting thin film composite membrane is found to be useful in gas separation and pervaporation.

Similar results are obtained when the tray containing the glass plate coated with Ziegler type catalyst is covered with a plate having an entrance duct and an exit duct and ethylene gas or propylene gas or a mixture of the two is admitted through the former duct and exhausted through the latter duct. Alternatively toluene saturated with ethylene and/or propylene may be added to the tray. The thin film composite membranes of polyethylene, polypropylene and/or polyethylene-co-propylene are also found to be useful in gas separation and pervaporation.

In this example the substrate is initially not porous but is instead a precursor of a porous substrate. Further the polymerization system for the vinyl and/or related monomer(s) is part of the solid substrate phase. The latter phase and the fluid phase containing the vinyl and/or related monomer(s) are substantially insoluble in each other.

Similar results are obtained when the microporous glass precursor is replaced with microporous diaphragm precursors prepared by thermal inversion from initially homogeneous polymer solutions through phase separation on cooling below the limit of polymer solubility. On phase separation, the solvent becomes dispersed in the form of minute droplets throughout the precipitating polymer phase. According to the present example these droplets are allowed to remain in the diaphragm until after a thin film of a polymer comprising a vinyl and/or related monomer is formed on or near the surface of the porous diaphragm precursor. Substrates of polypropylene ("PP"), polyethylene ("PE"), polystyrene ("PS"), polyamide ("PA"), polycarbonate ("PC") and polyphenylene oxide("PPO") are examples.

EXAMPLE 9

A glass plate prepared in accordance with the procedure of S. Matoba, Ceramics, 23(8), pp730-734(1988) and having about 77.5% silica, 5 percent alumina and 11% boron oxide and heat treated at a temperature in the range of 500° to 800° C. for sufficient time to develop pores of about 1 micrometer (when eventually leached in dilute hydrochloric acid) is leached in such acid, then in demineralized water. It is dried at room temperature and then in an oven at 105° C. After cooling to room temperature it is coated with a solution containing about 15 g/l N,N'-dimethyl methacrylamide in dry dimethyl formamide. The glass plate is dipped briefly in a solution of n-butyl lithium in hexane, then in hexane and finally in demineralized water. The resulting thin film composite membrane is found to be useful in nanofiltration and ultrafiltration.

EXAMPLE 10

A microporous diaphragm prepared from a polyetherketone ("PEK") in accordance with the teaching of application. Ser. No. 07/600,633, filed Oct. 22, 1990 (assigned to the same assignee as this application) is coated on one side with a mixture prepared by dissolving 15 grams of Sigma Chemical Company's agarose type IX in one liter of hot water, cooling to 50° C. and adding 15 grams of monomeric N,N'-methylene bisacrylamide and 0.3 grams of ferrous ammonium sulfate. The coated substrate is cooled to about 0° C. to cause the agarose to gel. The resulting structure is allowed to warm up to room temperature and any moisture condensed on the surface quickly blotted away with absorbent paper. It is placed in a shallow tray and briefly covered with a solution containing 2.4 g/l dibenzoyl peroxide in hexane. It is then removed from the tray, drained and heated in water at about 60° C. to melt the agarose and replace it in the interstices of the substrate with water. The resulting thin film composite membrane is found to be useful in nanofiltration and ultrafiltration.

In this example a vinyl and/or related monomer is in a solid phase (the agarose gel phase) in interstices at the surface of the porous support together with one required (necessary but not sufficient) component of a two component polymerization initiation system, and a second required component (also necessary but not sufficient) is in a fluid phase (the hexane phase). The two phases are substantially insoluble in each other and the polymerization of the vinyl and/or related monomer(s) takes place at or near the interface between the phases.

I claim:

1. A process for preparing a thin film in and/or on a porous support, said process comprising polymerizing in and/or on said porous support or a precursor of said support, monomers containing ethylenic moieties at or near an interface between a first phase containing at least one said monomer and a second phase containing at least one component required to polymerize said monomer through said ethylenic moieties.

2. Process of preparing a thin film membrane on and/or in a porous support said process comprising forming a first fluid mixture comprising at least one polymerizable monomer containing at least one ethylenic group in its structure and a second fluid mixture comprising at least one component adapted to polymerize said monomer through said at least one ethylenic group, said first and second mixture being substantially insoluble in each other, contacting said substrate first with one of said mixtures and then with the other at a temperature and for a time sufficient to at least initiate polymerization of said monomer, thereby forming a thin film membrane on and/or in said support.

3. A process for preparing a thin film in and/or on a porous support, said support or a precursor of said support containing on the surface and/or in the interstices thereof one of the following phases:

a phase comprising at least one monomer polymerizable through an ethylenic group in its structure;

a phase comprising an entity necessary to initiate polymerization of said monomer through said ethylenic group;

both phases characterized further by being substantially insoluble in each other, comprising contacting said support or precursor containing one of said phases with the other phase at a temperature and for a time sufficient at least to initiate polymerization of said monomer through said ethylenic group, thereby forming a thin film on and/or in said support or precursor.

4. A process according to claim 3 in which phase A is a liquid and said at least one monomer polymerizable through an ethylenic group in its structure is present at a concentration in the range of from about 0.1 to about 10 percent by weight.

5. A process according to claim 3 in which phase A is a liquid and said at least one monomer polymerizable through an ethylenic group in its structure is present at a concentration in the range of from about 0.5 to about 2 percent by weight.

6. A process according to claim 3 in which phase B is a liquid and said entity necessary to initiate polymerization of said monomer is present in the range of from about 0.1 to about 10 percent by weight.

7. A thin film in and/or on a porous support said film prepared from said support or a precursor of said support containing on the surface and/or in the interstices of said support or precursor one of the following phases:

a phase A comprising at least one monomer polymerizable through an ethylenic group in its structure;

a phase B comprising an entity necessary to cause addition of said monomer through said ethylenic group;

both phases characterized further by being substantially insoluble in each other, said film prepared by a process comprising contacting said support or precursor comprising one of said phases with the other phase at a temperature and for a time sufficient at least to initiate polymerization of said monomer, thereby forming said film on and/or in said support or precursor.

8. A thin film according to claim 7 having an amide capacity of at least 2 milligram equivalents of amide moieties per gram of dry film.

9. A process for separating a fluid mixture into less permeable and more permeable fractions comprising contacting said mixture with the active face of a thin film made according to claim 4.

10. A thin film according to claim 7 in which said at least one monomer polymerizable through an ethylenic group in its structure is an amide.

11. A thin film in and/or on a porous support, said film prepared from said support or a precursor of said support containing on the surface and/or in the interstices of said support or precursor one of the following phases:

a phase A containing at least one polymerizable vinyl or related monomer;

a phase B comprising an entity necessary to initiate polymerization of said monomer;

both phases further characterized by being substantially insoluble in each other, said film prepared by a process comprising contacting said support or precursor comprising one of said phases with the other phase at a temperature and for a time sufficient at least to initiate polymerization of said monomer, thereby forming said film on and/or in said support or precursor, said thin film having an amide capacity of at least about 2 milligram equivalents of amide moieties per gram of dry film and a water content when in equilibrium with water of not more than about 15 percent.

12. A thin film and/or on a porous support, said film prepared from said support or a precursor of said support containing on the surface and/or in the interstices of said support or precursor one of the following phases:

a phase A comprising at least one polymerizable vinyl or related monomer;

a phase B comprising an entity necessary to initiate polymerization of said monomer; both phases further characterized by being substantially insoluble in each other, said film prepared by a process comprising contacting said support of precursor comprising one of said phases with the other phase at a temperature and for a time sufficient at least to initiate polymerization of said monomer, thereby forming said film on and/or in said support or precursor, said thin film having an amide capacity when in equilibrium with water of not less than about 10 milligram equivalents of amide moieties per gram of imbibed water.

13. A thin film in and/or on a porous support, said film prepared from said support or a precursor of said support containing on the surface and/or in the interstices of said support or precursor one of the following phases:

a phase A comprising at least one polymerizable vinyl or related monomer;

a phase B comprising an entity necessary to initiate polymerization of said monomer;

both phases characterized further by being substantially insoluble in each other, said film prepared by a process comprising contacting said support or precursor comprising one of said phases with the other phase at a temperature and for a time sufficient at least to initiate polymerization of said monomer, thereby forming said film on and/or in said support or precursor, in which said at least one polymerizable vinyl or related monomer is selected from the group consisting of the chemical formulas:

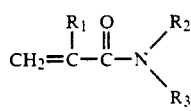
(1)

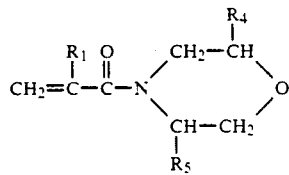
(2)

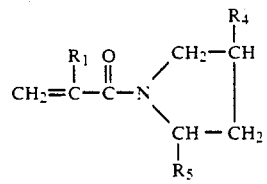
(3)

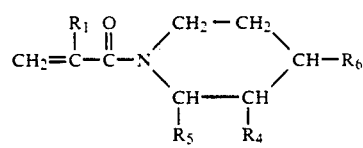
(4)

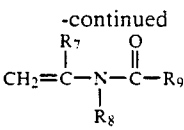
(5)

where R1, R2 and R3 are independently alkyl, alkoxy or alkoxyalkyl groups or hydrogen;

R4, R5 and R6 are independently hydrogen, alkyl, alkoxy or alkoxyalkyl groups;

R7, R8 and R9 are independently hydrogen, alkyl, alkoxy or alkoxyalkyl groups or any two of R7, R8 and R9 are part of the same cyclic alkyl, alkoxy or alkoxyalkyl group.

14. A thin film in and/or on a porous support said film prepared from said support or a precursor of said support containing on the surface and/or in the interstices of said support or precursor one of the following phases:

a phase A comprising at least one polymerizable vinyl or related monomer;

a phase B comprising an entity necessary to initiate polymerization of said monomer;

both phases characterized further by being substantially insoluble in each other, said film prepared by a process comprising contacting said support or precursor comprising one of said phases with the other phase at a temperature and for a time sufficient at least to initiate polymerization of said monomer, thereby forming said film on and/or in said support or precursor, in which said at least one polymerizable vinyl or related monomer is selected from the group consisting of N,N-dialkyl methacrylamides, alkyl methacrylates, methacrylic acid, N-vinyl formamides, N-vinyl pyrrolidone, N-vinyl caprolactam, N-vinyl acetamide, N-vinyl succinimide, N-vinyl phthalimide, N-vinylethylene urea, N-vinyl propylene urea, allyl urea, crotonamide, S-vinyl sulfonamides, N-vinyl sulfonamides, P-vinyl phosphonamides, N-vinyl phosphonamides, vinyl acetate, divinyl sulfone, methylene bis methacrylamide, methylene bis methacrylamide analogoues, N,N'-bis methacrylopiperazinimide, N-methacrylomorpholinimide, N-methacrylopiperidinimide, piperazine methacrylate, piperidine methacrylate, piperazine dimethacrylate, morpholine methacrylate, N,N'-methylene bisacrylamide, divinyl benzene, styrene, ethylene and propylene.

* * * * *

UNITED STATES PATENT AND TRADEMARK OFFICE
CERTIFICATE OF CORRECTION

PATENT NO. : 5,118,424
DATED : June 2, 1992
INVENTOR(S) : Wayne A. McRae

It is certified that error appears in the above-identified patent and that said Letters Patent is hereby corrected as shown below:

Title page, item [54] and column 1, line 3, change "Nomomers" to --Monomers--.

Column 12, Claim 12, line 9, after "monomer" begin a new line;
line 12, delete "of" and substitute--or--;

Column 14, Claim 14, line 27, delete "analogoues" and substitute--analogues--.

Signed and Sealed this

Twenty-first Day of September, 1993

Attest:

BRUCE LEHMAN

*Attesting Officer*     *Commissioner of Patents and Trademarks*